United States Patent [19]
Ellis et al.

[11] Patent Number: 5,092,542
[45] Date of Patent: Mar. 3, 1992

[54] ORDNANCE EJECTOR SYSTEM FOR AN AIRCRAFT

[75] Inventors: Larry G. Ellis, Provo, Utah; William R. Carter, Dayton, Ohio

[73] Assignee: Teleflex Incorporated, Limerick, Pa.

[21] Appl. No.: 688,462

[22] Filed: Feb. 19, 1991

[51] Int. Cl.⁵ .................................................. B64D 1/06
[52] U.S. Cl. .................................... 244/137.4; 89/1.54
[58] Field of Search ............... 244/137.1, 137.4, 118.1; 89/1.54, 1.58, 1.59, 1.57

[56] References Cited
U.S. PATENT DOCUMENTS

| | | | |
|---|---|---|---|
| 3,273,459 | 9/1966 | Lordin | 244/137.4 |
| 3,719,338 | 3/1973 | Ruggeri | 244/137.4 |
| 3,799,478 | 3/1974 | Costes et al. | 244/137.4 |
| 4,440,365 | 4/1984 | Holtrop | 244/137 |
| 4,572,053 | 2/1986 | Sosnowski et al. | 89/1.51 |
| 4,600,171 | 7/1986 | Kalisz | 244/137 |
| 4,669,356 | 6/1987 | Griffin et al. | 89/1.57 |
| 4,679,751 | 7/1987 | Peterson | 244/137.4 |

FOREIGN PATENT DOCUMENTS

503816 6/1954 Canada .............................. 244/137.4

Primary Examiner—Galen Barefoot
Attorney, Agent, or Firm—Reising, Ethington, Barnard, Perry & Milton

[57] ABSTRACT

A ordnance ejector apparatus (10) for ejecting an ordnance from an aircraft includes a mechanical linkage comprising a forward bell crank (36) and a forward connecting link (46) and a rearward bell crank (50) and a rearward connecting link (60). A rail (24) releasably retains an ordnance (16) thereto and is pivotally connected at opposite ends (26, 28) to the forward connecting link (46) and the rearward connecting link (60). Two pyrotechnically operated pistons (78, 88) are disposed in end-to-end relation and act independently on the forward bell crank (36) and rearward bell crank (50). The rail (24) includes a plurality of ordnance retaining hooks (152) which are automatically actuated to release the ordnance (16) when the rail (24) is extended by the mechanical linkage. A mechanical hoist (108) is manually operated by a screw shaft (110) for manually extending the rail (24) to attach an ordnance (16) thereto.

14 Claims, 9 Drawing Sheets

ORDNANCE EJECTOR SYSTEM FOR AN AIRCRAFT

TECHNICAL FIELD

The subject invention relates generally to bomb, flare and signal dropping, and more specifically to bomb, or ordnance, ejected from the exterior of an aircraft.

BACKGROUND ART

According to the well known principles of fluid dynamics, as an aircraft flies through the air, a boundary layer of turbulent air develops about all exterior surfaces of the aircraft. In order to properly deploy an ordnance from underneath the aircraft, the ordnance must be pushed through this boundary layer before being fully released from control. If the ordnance is not pushed through the boundary layer, the turbulent air within the boundary layer may act unpredictably upon the ordnance, perhaps causing it to bounce against the under surface of the aircraft thereby causing damage.

Typically, ordnance ejector systems function either by mechanical linkages which push the ordnance through the turbulent boundary layer, or axially moving reciprocating shafts which push the ordnance through the turbulent boundary layer. Examples of the linkage type ordnance ejector systems include U.S. Pat. Nos. 4,440,365 to Holtrop, issued Apr. 3, 1984, 4,679,751 to Peterson, issued July 14, 1987 and 4,600,171 to Kalisz, issued July 15, 1986. An example of the axially moving reciprocating shaft type ordnance ejector system is the U.S. Pat. No. 4,572,053 to Sosnowski et al, issued Feb. 25, 1986.

Typically, the linkage type ordnance ejector systems include a forward and rearward linkage connected to a rail member, wherein the rail member releasably retains the ordnance thereto. The forward and rearward linkages are controlled by one or more actuators. Ordnance is loaded onto the ejector apparatus by a ground crew technician.

Because the linkages and actuator typically maintain the rail in a retracted, well nested condition under the aircraft, the ground crew technician must force the rail downwardly, away from the aircraft in order properly attach the ordnance to the rail with all of the attendant electrical connections. This prying away of the rail is usually accomplished by a so-called hoist assembly which is connected and disconnected by the ground crew technician. As the ground crew technician would attempt to load an ordnance to the rail, he or she would attach the hoist assembly to the ejector apparatus and manually force apart the rail, usually against the biasing of return springs located in the actuator. When the ordnance loading was complete, the technician would consciously remove the hoist assembly. If the hoist assembly was inadvertently left attached to the ejector apparatus, then significant damage could be done to the ejector apparatus and possibly the aircraft.

SUMMARY OF THE INVENTION AND ADVANTAGES

An ordnance ejector apparatus is provided for ejecting an ordnance from an aircraft. The apparatus comprises a support frame extending between a forward end and a rearward end for fixed attachment to an aircraft, a rail extending between a forward end and a rearward end for releasably retaining an ordnance thereto, a forward link means pivotally connected between the forward end of the support frame and the forward end of the rail for displacing the forward end of the rail a predetermined distance from the support frame, a rearward link means pivotally connected between the rearward end of the support frame and the rearward end of the rail for displacing the rearward end of the rail a predetermined distance from the support frame, and an actuator means for controlling the pivotal movement of the forward and rearward link means. The invention is characterized by including a hoist means operatively extending between the support frame and the rail for manually forcibly separating the rail from the support frame to attach an ordnance to the rail and for automatically disengaging from the actuator means when the actuator means is actuated to allow uninterrupted ejection of the ordnance.

The subject invention overcomes the deficiencies in the prior art by providing the hoist means which remains permanently attached to the ejector apparatus. Therefore, the ground crew technician does not have to remember to remove the hoist means after loading the ordnance. However, when an ordnance is ejected, i.e., when the actuator is actuated, the hoist means automatically disengages from the ejector apparatus so as not to interfere with the ejection. Therefore, the subject ordnance ejector apparatus is safer, simpler and hence more desirable than the prior art devias.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
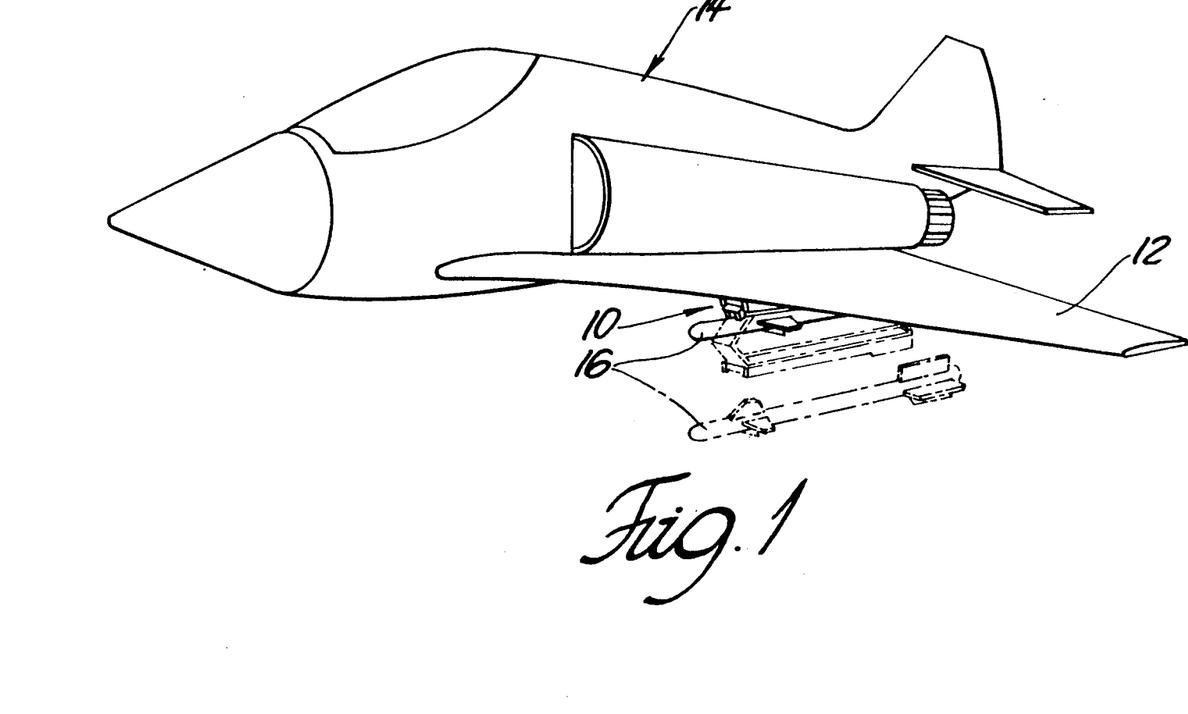
FIG. 1 is an environmental view showing the subject invention disposed underneath an aircraft, with the ordnance shown in an ejected position in phantom.

Referring to the Figures, wherein like numerals are used to indicate like or corresponding parts throughout the several views, an ordnance ejector apparatus according to the subject invention is generally shown at 10. In FIG. 1, the apparatus is shown disposed underneath a wing 12 of an aircraft, generally indicated at 14.

An ordnance 16 is shown suspended under the apparatus 10. In order to safely deploy the ordnance 16, the subject apparatus 10 extends downwardly from the aircraft wing 12, as shown in phantom, to push the ordnance 16 through the turbulent boundary layer and into stable ambient air.

Figure 2:
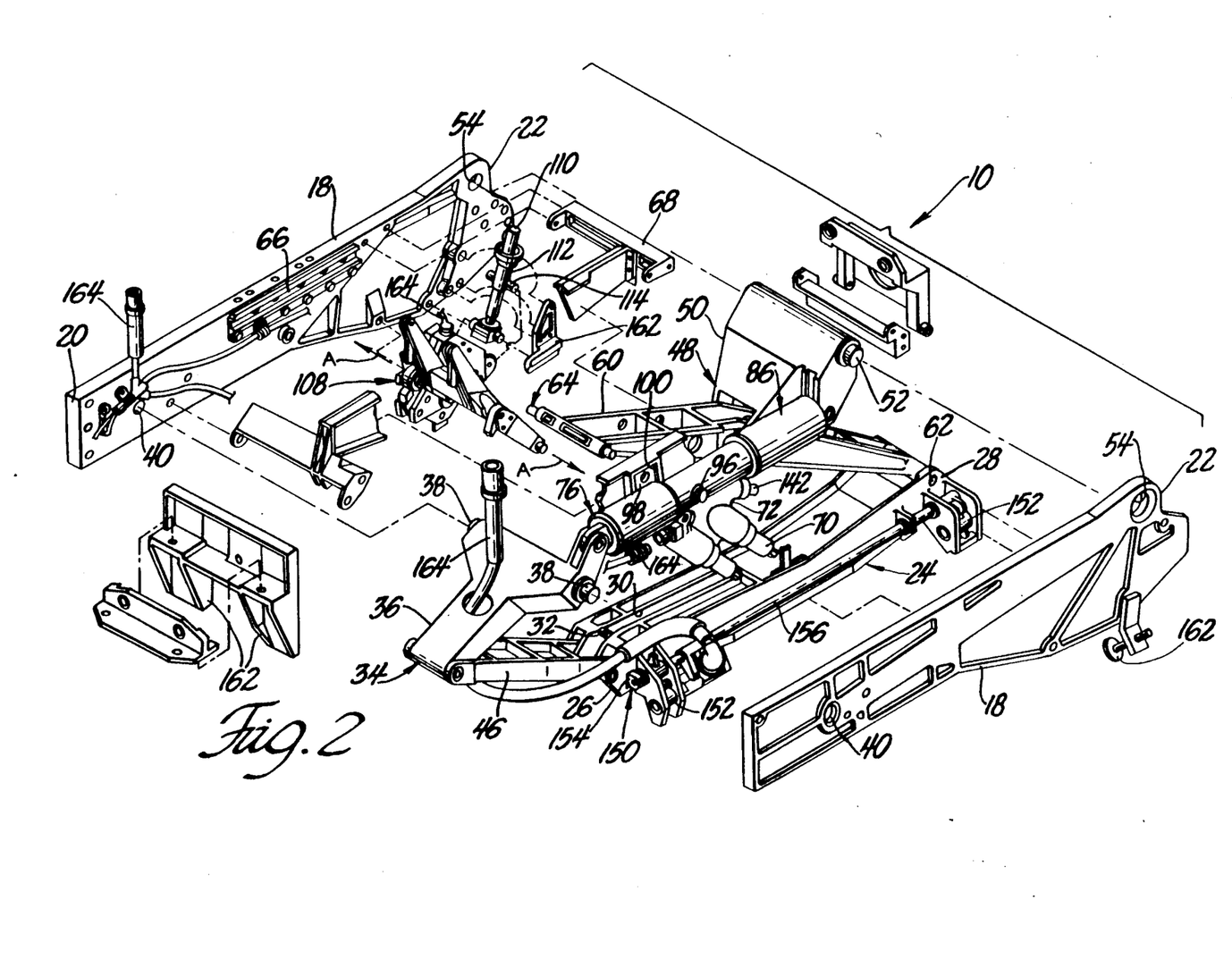
FIG. 2 is an exploded perspective view of the subject invention.
Figure 3:
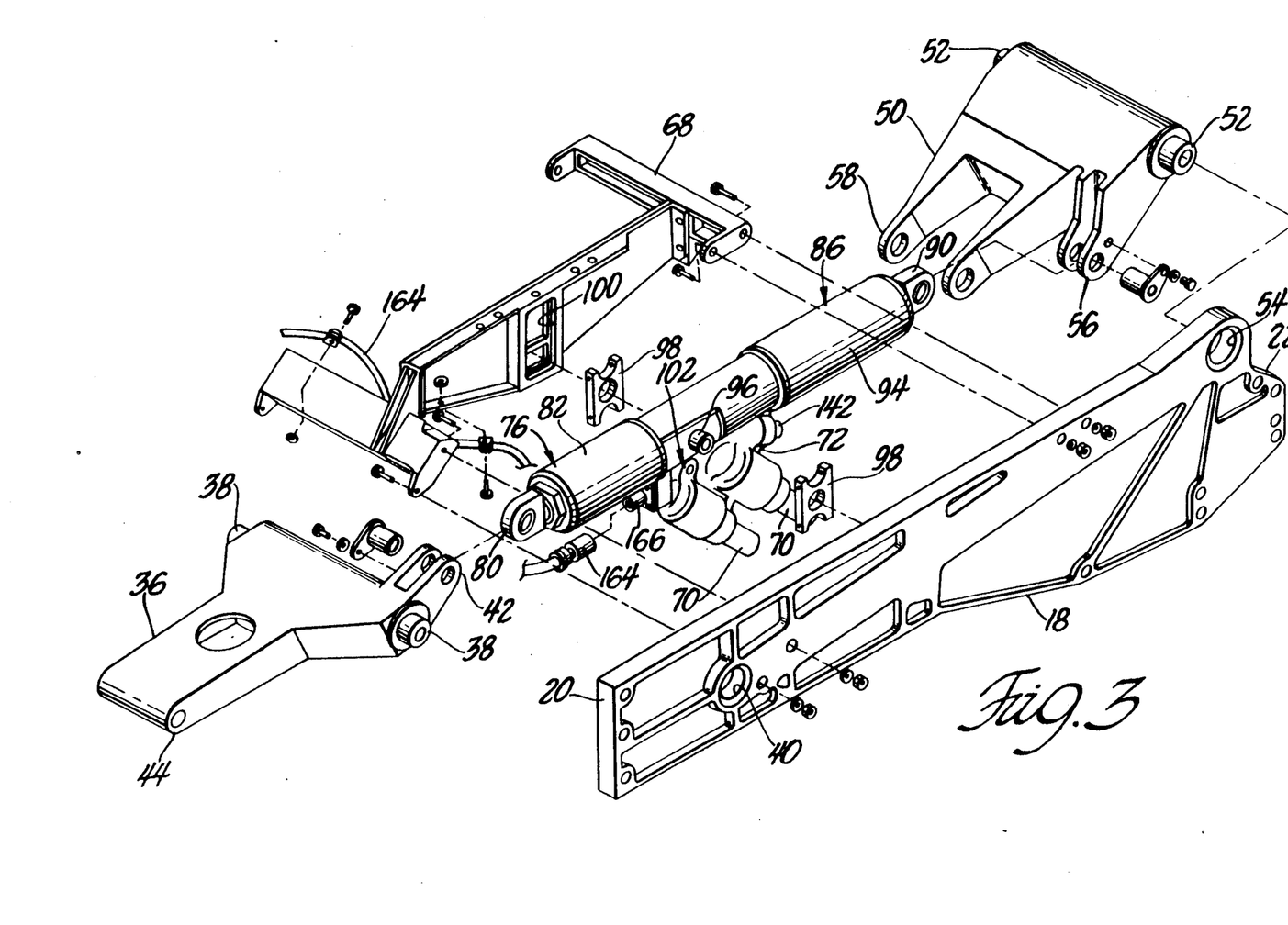
FIG. 3 is an exploded perspective view of the forward and rearward actuator means of the subject invention and forward bell crank and the rearward bell crank.
Figure 5:
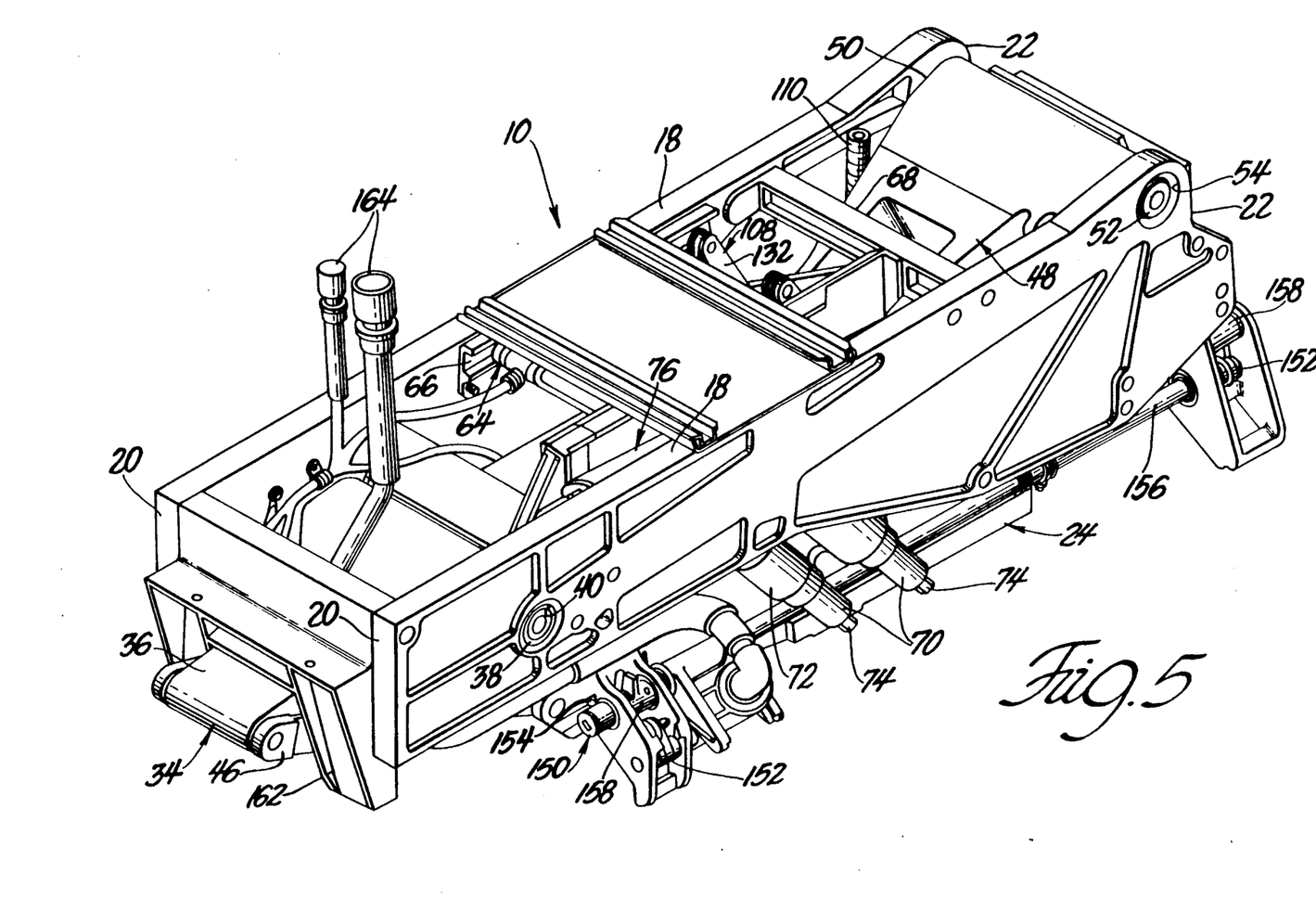
FIG. 5 is an assembled perspective view of the subject invention.

In FIGS. 2, 3 and 5, the apparatus 10 is shown including a support frame 18 comprising right and left halves that respectively extending between a forward end 20 and a rearward end 22 for fixed attachment to the aircraft 14. A rail, generally indicated at 24, extends between a forward end 26 and a rearward end 28 for releasably retaining an ordnance 16 thereto. More specifically, the ordnance 16 is disposed directly below, and is suspended from, the rail 24. As shown in FIG. 2, the rail 24 includes a longitudinally extending vertical opening 30 adjacent its forward end 26 for receiving a fin of the ordnance 16. In this manner, the ordnance is centrally supported under the rail 24 with its four outwardly extending forward stabilizer fins disposed in a "+" orientation. A spacer 32 is disposed within the forward end of the opening 30.

As shown in FIGS. 2 and 6-8, a forward link means, generally indicated at 34, is pivotally connected between the forward end 20 of the support frame 18 and the forward end 26 of the rail 24 for displacing the forward end 26 of the rail 24 a predetermined distance from the support frame 18. The forward link means 34 includes a forward bell crank 36 having pintles 38 pivotally received in sockets 40 adjacent the forward ends 20 of each of the support frames 18. The forward bell crank 36 has a driving end 42 and a driven end 44. The forward link means 34 also includes a forward connecting link 46 pivotally extending between the driven end 44 of the forward bell crank 46 and the forward end 26 of the rail 24. The forward bell crank 36 and forward connecting link 46 generally resemble a half-scissor mechanism, as shown in the Figures.

A rearward link means, generally indicated at 48, is pivotally connected between the rearward end 22 of each of the support frames 18 and the rearward end 28 of the rail 24 for displacing the rearward end 28 of the rail 24 a predetermined distance from the support frames 18. The rearward link means 48 includes a rearward bell crank 50 having outwardly extending pintles 52 pivotally received in corresponding sockets 54 adjacent the rearward ends 22 of the support frames 18. The rearward bell crank 50 has a driving end 56 and a driven end 58.

The rearward link means 48 further includes a rearward connecting link 60 extending from a pivotal connection 62 at the rearward end 28 of the rail 24 to a lost motion sliding connection, generally indicated at 64, at one of the support frames 18. The lost motion sliding connection 64 includes a linear slot 66 disposed in one of the support frames 18 and extending generally longitudinally between the forward 20 and rearward 22 ends of the one support frame 18. Therefore, the slot 66 is generally horizontal as shown in the Figures. A second slot, not shown in the Figures, is identical to and aligned with the slot 66 and disposed on a brace member 68 which is securely fastened between the two support frames 18. The driven end 58 of the rearward bell crank 50 is pivotally connected to the rearward connecting link 60 generally midway between its pivotal connection 62 and its lost motion sliding connection 64. The rearward bell crank 50 and rearward connecting link 60 generally resemble a three-quarter scissor mechanism, as shown in the Figures.

The apparatus 10 also includes a single energy source comprising a pair of replaceable cartridges each disposed in a cartridge holder 70. The cartridges and their cartridge holders 70 are supported in a breech housing 72. Preferably, the cartridges comprise a solid fuel, e.g., nitroglycerin, pyrotechnic device for quickly generating large quantities of energy. The cartridge holders 70 are threadably receiving in the breech housing 72, and include tool engaging ends 74 to effect a secure seat within the breach housing 72.

Figure 4:
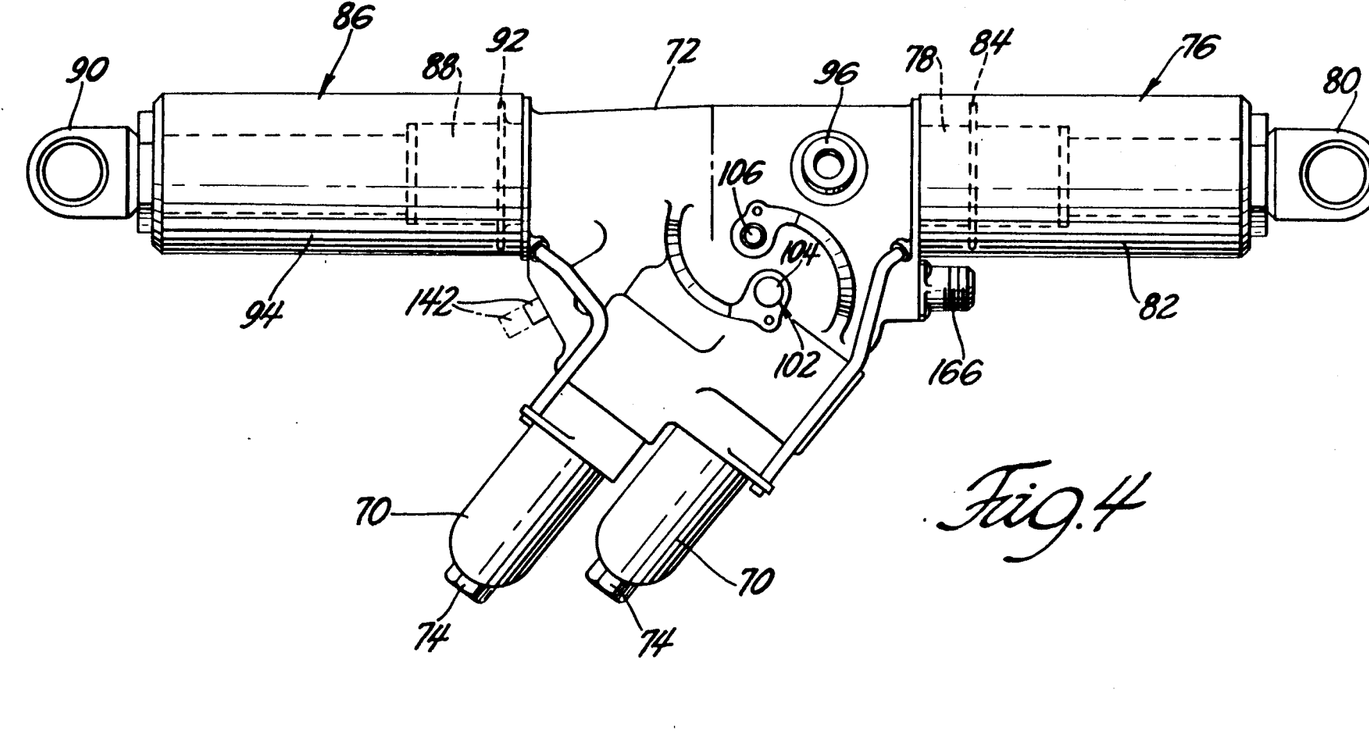
FIG. 4 is a side view of the forward and rearward actuator means, the energy conduction means and the energy source of the subject invention.

As shown in FIGS. 2-4, the apparatus 10 includes a forward actuator means, generally indicated at 76, extending from the forward end of the breech housing 72. The forward actuator means 76 is energized from the cartridges and operatively connected to the forward link means 34. As shown in FIGS. 2 and 3, the forward actuator means 76 is connected to the drive end 42 of the forward link means 34 for independently controlling pivotal movement of the forward link means 34.

Referring again to FIG. 4, the forward actuator means 76 includes a piston 78 extending from a forward cylinder in the breech housing 72. The piston 78 generally comprises an elongated shaft having a distal end 80 connected to the driving end 42 of the forward bell crank 36. The forward piston 78 is surrounded by an outer jacket 82 which is fixed to the breech housing 72. An annular flange 84 is disposed about the forward piston 78, within the jacket 82. Although not shown, a compression spring is disposed within the jacket 82, about the exterior of the forward piston 78, and acts between the flange 84 and the inside end of the jacket 82 adjacent the distal end 80 of the forward piston 78. Therefore, whenever the piston 78 is extended outwardly from the breech housing 72, the compression spring is compressed within the jacket 82.

Similarly, a rearward actuator means, generally indicated at 86, extends from the breech housing 72. The rearward actuator means 86 is also energized from the one common energy source, i.e., the cartridges, for independently controlling the pivotal movement of the rearward link means 48. As with the forward actuator means 76, the rearward actuator means 86 includes a rearward piston 88 extending from a cylinder in the breech housing 72. The rearward piston 88 includes a distal end 90 connected to the driving end 56 of the rearward bell crank 50. A flange 92 is disposed annularly around the rearward piston 88, adjacent the breech housing 72. A jacket 94 is fixedly connected to the breech housing 72 and surrounds the piston 88. A compression spring, not shown, is disposed within the jacket 94 and bears against the flange 92 of the rearward piston 88.

The breech housing 72, therefore, forms an interface between the forward 76 and rearward 86 actuator means, as well as the energy source cartridges. The breech housing 72 supports the pistons 78, 88 such that they stroke in linearly opposite directions from one another. More importantly, the breech housing 72 maintains the forward actuator means 76 and rearward actuator means 86 such that they are fixedly aligned in axially oppositely extending directions so that the linear output stroke of the forward piston 78 acts along a colinear and opposite direction from the linear output stroke of the rearward piston 88 to reduce the reaction forces between the forward and rearward actuator means 76, 86.

The breech housing 72 includes two outwardly extending support pins 96. As best shown in FIG. 3, the support pins 96 are disposed in respective vertical sliders 98, which in turn are disposed within vertical tracks 100. One of the vertical tracks is provided in the brace member 68 and the other in one of the support frames 18. In this manner, as the forward 78 and rearward 88 pistons are stroked in order to rotate the respective bell cranks 36, 50, the entire breech housing 72 and attached elements are permitted to rotate about the support pins 96 and vertically shift within the vertical tracks 100.

Referring again to FIG. 4, the subject apparatus 10 includes an energy conduction means, generally indicated at 102, for conducting energy from the energy source of the cartridges firstly to the forward actuator means 76 and secondly to the rearward actuator means 86 to initiate movement of the forward link means 34 before movement of the rearward link means 48 to initially displace the rail 24 in a forward end 26 down condition whereby the ordnance 16 is initially ejected in a forward end, or nose end, down condition. The energy conduction means 102 is disposed within the breech housing 72 and includes a velocity orifice 104 and a pitch orifice 106. The internal routing and conduction lines disposed within the breech housing 72 extend from both of the cartridges in the cartridge holders 70 to the velocity orifice 104.

The velocity orifice 104 comprises a flow restriction which can be made either adjustable, or in the alternative non-adjustable. If non-adjustable, the velocity orifice 104 would be replaceable with different velocity orifices having different flow restriction characteristics. The greater the flow restriction of the velocity orifice 104, the less energy is allowed to flow from the cartridges to the forward 76 and rearward 86 actuator means. Therefore, the greater the flow restriction of the velocity orifice 104, the slower the response of the pistons 78, 88 and the slower the ordnance 16 will be ejected.

The internal flow passages in the breech housing 72 extend from the velocity orifice 104 directly to the cylinder inside the breech housing 72 in which is disposed the forward piston 78. Therefore, energy, or gases, from the cartridges in the cartridge holders 70 pass first through the velocity orifice 104 and then directly to the forward piston 78, causing the forward link means 34 to begin moving. The energy is then directed from the forward piston 78 to a pitch orifice 106.

The pitch orifice 106, like the velocity orifice 104, comprises a flow restriction which can be made either adjustable or non-adjustable but replaceable with different orifices having different flow restriction characteristics. Energy flowing through the pitch orifice 106 is directed to the cylinder in the breech housing 72 in which is disposed the rearward piston 88. Therefore, by increasing the flow restriction of the pitch orifice 106, less energy will be directed to the rearward piston 88, thereby causing it to stroke more slowly. In this manner, the pitch of the rail 24, and hence the pitch of the ordnance 16 upon release, can be easily adjusted by changing the flow restriction of the pitch orifice 106.

Figure 6:
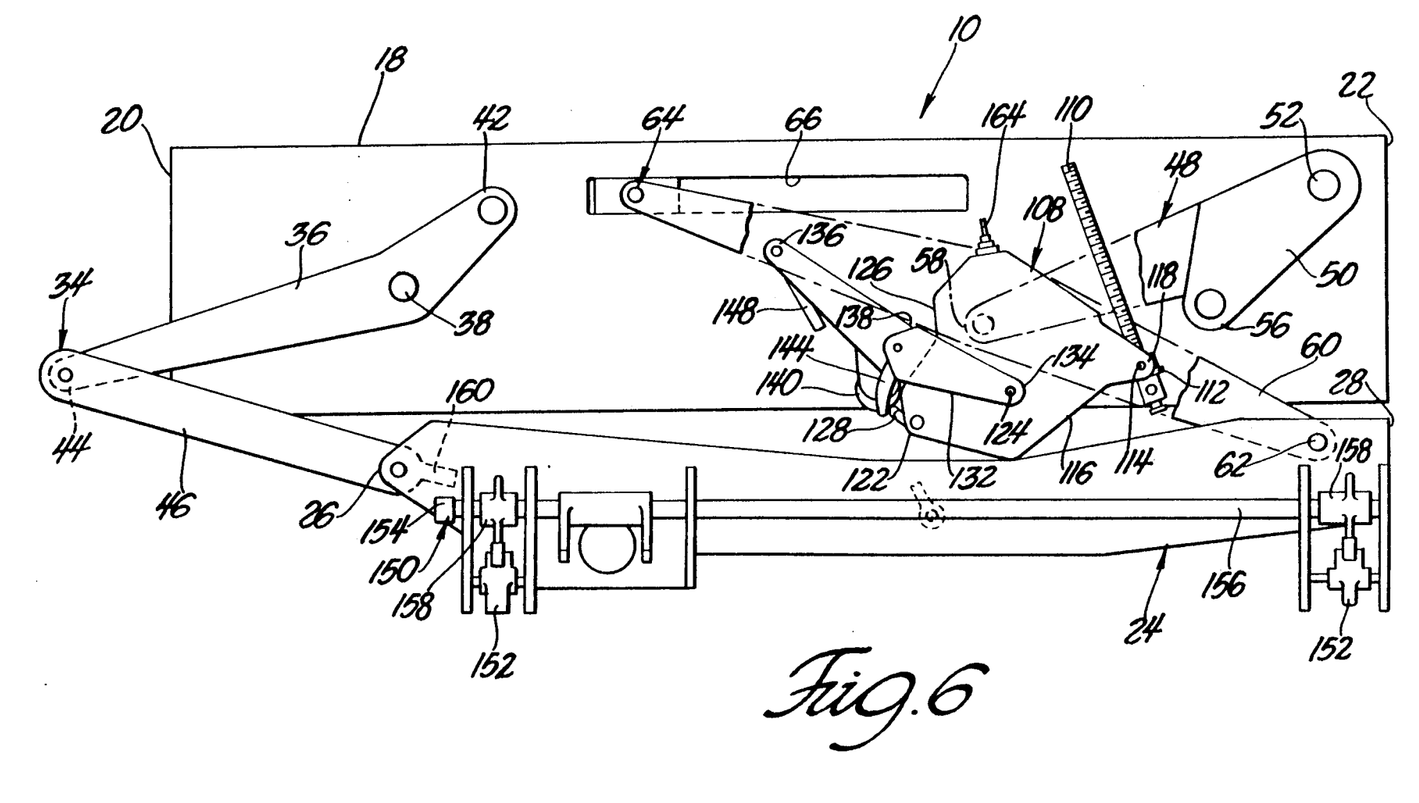
FIG. 6 is a simplified side view of the hoist means of the subject invention shown with the rail disposed in a retracted position.
Figure 7:
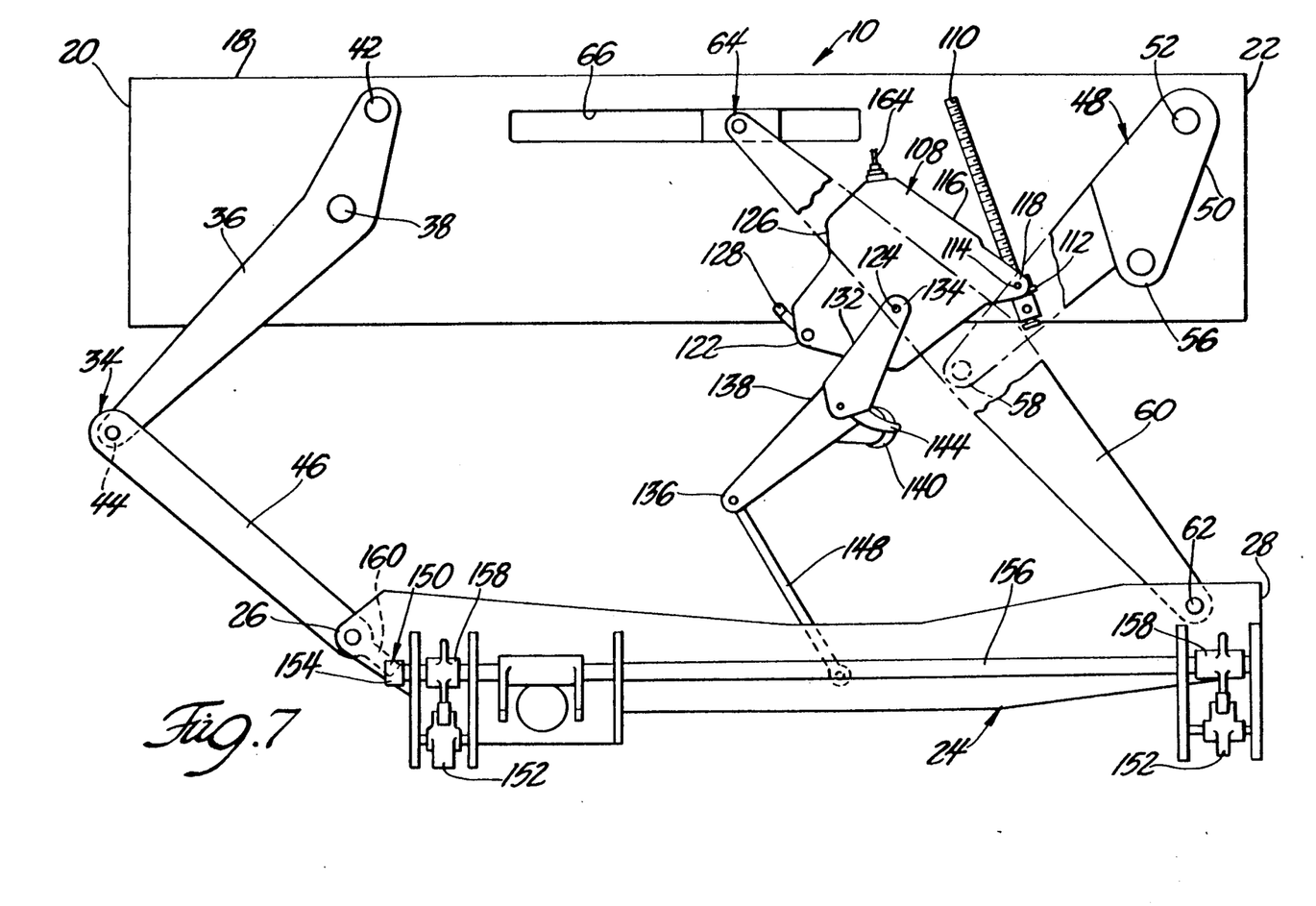
FIG. 7 is a simplified side view as in FIG. 6 showing the hoist means of the subject invention disengaged and the rail in an extended position.
Figure 8:
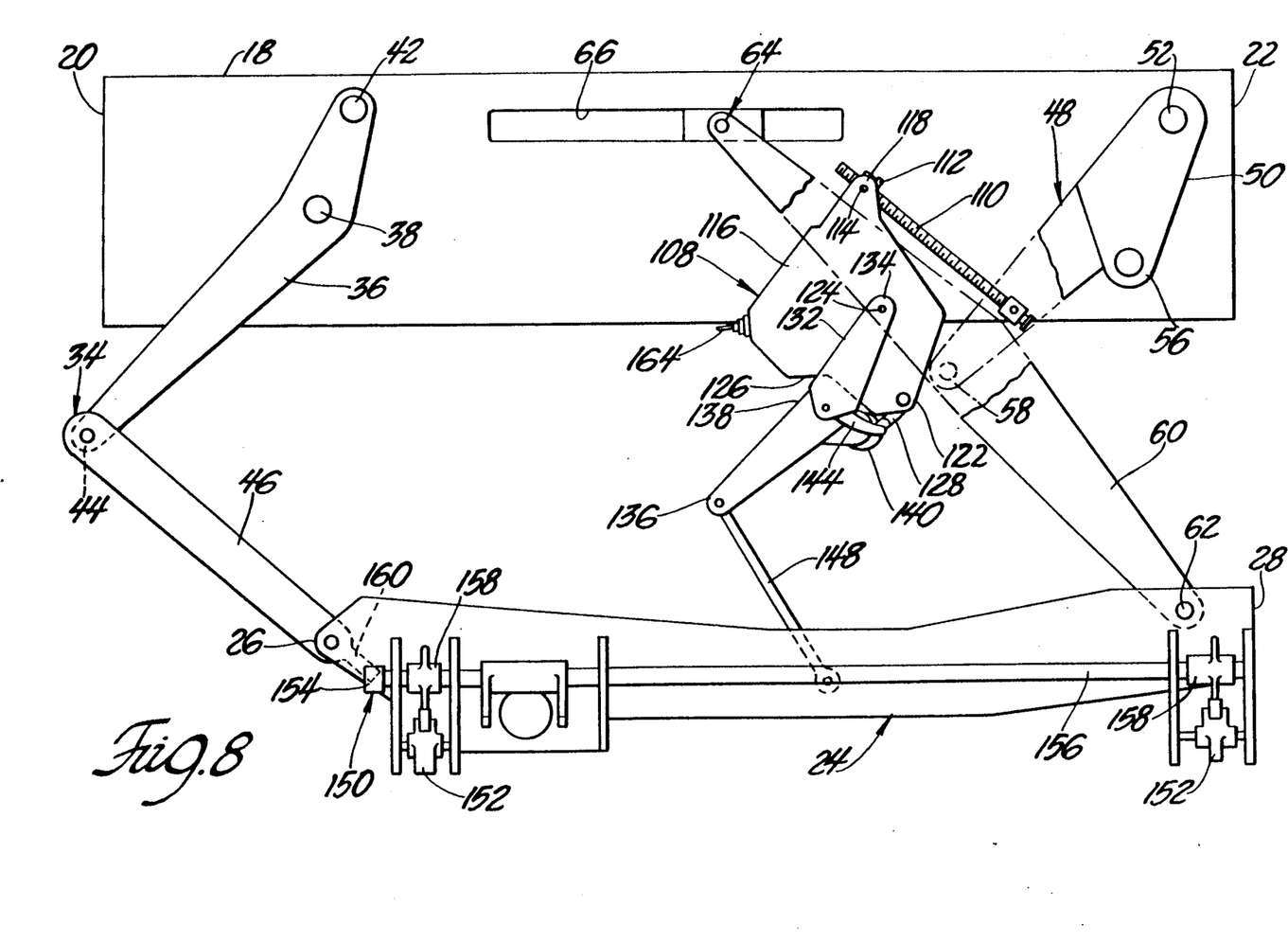
FIG. 8 is a simplified side view as in FIGS. 6 and 7 showing the hoist means of the subject invention engaged so as to forcibly extend the rail to an extended position.

Referring now to FIGS. 6-8, the subject invention includes a hoist means, generally indicated at 108, which operatively extends between the support frame 18 and the rail 24. As shown in the Figures, the hoist means 108 is mechanically connected between the support frame 18 and the rail 24 for manually forcibly separating the rail 24 from the support frame 18 in order to attach an ordnance 16 to the rail 24. That is, the hoist means 108 functions to force apart the rail 24 to an extended position as shown in FIG. 8 for the purpose of mounting an ordnance 16 to the underside of the rail 24. Also, the hoist means 108 automatically disengages from the forward 76 and rearward 86 actuator means when the actuator means 76, 86 is actuated so as to allow uninterrupted ejection of the ordnance 16, as illustrated in FIG. 7. That is, because the hoist means 108 remains continually operatively and connected between the support frame 18 and the rail 24, it must automatically disengage from the actuator means 76, 86 upon actuation so as not to interfere with the extension of the rail 24 upon ejection of the ordnance 16.

The hoist means 108 includes an elongated screw shaft 110 supported on the support frame 18 for independent rotation. A travelling nut 112 is threadably disposed on the screw shaft 110 for axial movement along the screw shaft 110 in response to rotation thereof. As perhaps best shown in FIG. 2, the travelling nut 112 includes a pair of outwardly extending pintles 114.

Figure 9:
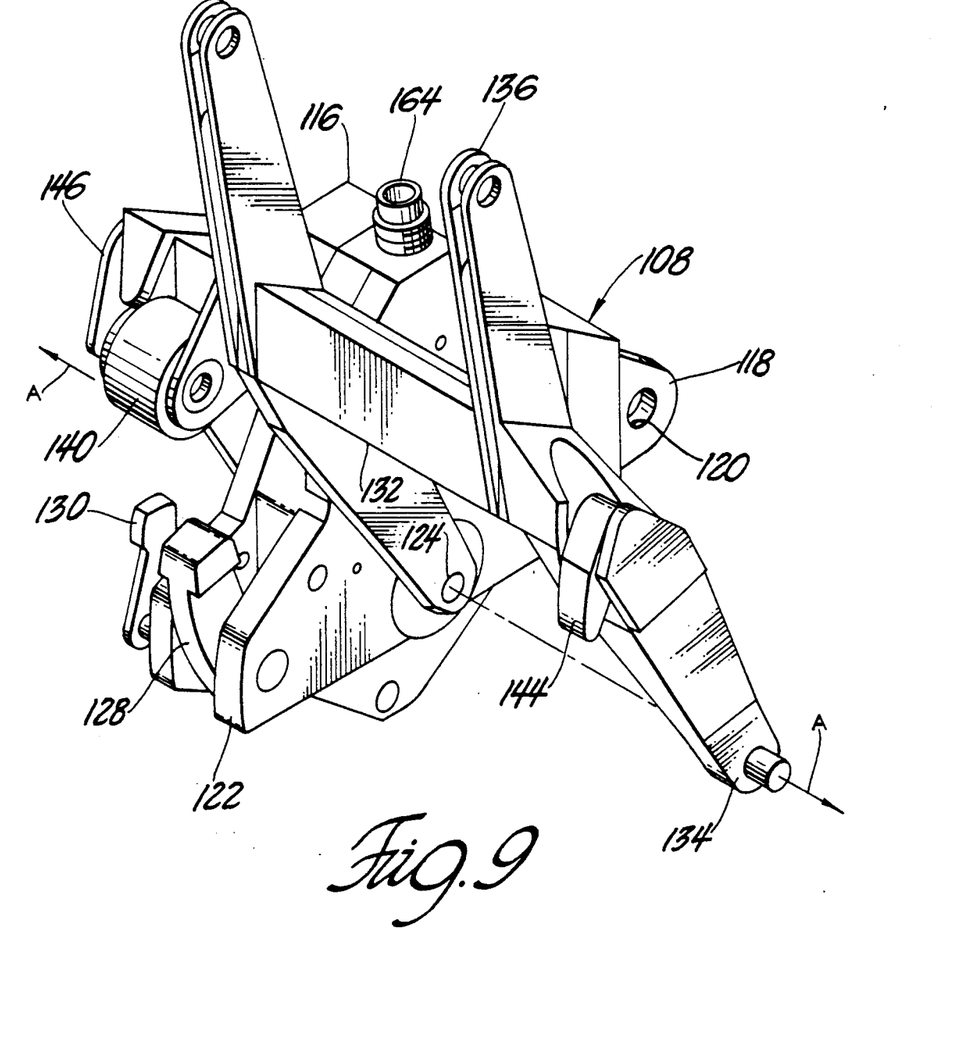
FIG. 9 is a perspective view of a portion of the hoist means of the subject invention.

The hoist means 108 also includes a lever 116 extending between a first end 118 having a pair of spaced openings 120 for pivotally receiving the pintles 114 of the travelling nut 112. The lever 116 also has a second end 122 spaced from the first end 118, with a central fulcrum 124 disposed approximately midway between first 118 and second 122 ends, as shown in FIG. 9. The second end 122 of the lever 116 includes a load bearing surface 126 and a latch 128 spaced below the load bearing surface 126. The latch 128 is pivotally disposed on the second end 122 of the lever 116 and includes a coaxially spaced offset side cam 130 moveable with the latch 128. Therefore, movement of the side cam 130 causes a corresponding movement response in the latch 128.

The hoist means 108 further includes a brace 132 extending between a lower end 134 and an upper end 136. The lower end 134 is pivotally connected to the support frame 118 along an axis A passing coaxially through the central fulcrum 124 of the lever 116. Therefore, the hoist means 108 is pivotally attached to the support frame 118 about an axis A common to the pivotal attachment of the brace 132 to the support frame 18. The brace 132 includes a member disposed adjacent the second end 122 of the lever 116 and having a load bearing surface engaging portion 138, shown in FIGS. 6-8, and a latch engaging portion 140. As shown in FIG. 9, the latch engaging portion 140 comprises a cylindrical roller disposed to engage the latch 128 of the lever 116.

Referring back to FIGS. 2-4, the breech housing 72 is shown including a linearly stroking firing piston 142 which is disposed upstream of the energy source of the cartridges in the cartridge holders 70 from the forward actuator means 76. That is, the energy conduction means 102 conducts energy from the fired cartridges first to the firing piston 142, and then to the forward actuator means 76. In this manner, the firing piston 142 is actuated chronologically first. In FIG. 4, the firing piston 142 is shown in a stroked, or an actuated, position in phantom.

The brace 132 includes a pivotally supported trip finger 144 disposed adjacent the firing piston 142. An elongated shaft (not shown) extends through the brace member, parallel to the axis A, to integrally connect the trip finger 144 to a latch actuator 146. The latch actuator 146 is disposed to engage the side cam 130 of the lever 116 when the latch engaging portion 140 of the brace 132 abuts the latch 128 of the lever 116. Therefore, when the cartridges 170 are fired, the energy conduction means 102 conducts the energy first to the firing piston 142, which strokes linearly outwardly to engage and pivotally displace the trip finger 144. Arcuate movement of the trip finger 144 causes the latch actuator 146 to rotate, thereby camming the side cam 130 pivotally about its integral support with the latch 128. The latch 128, thus, rotates inwardly toward the lever 116, out from beneath the latch engaging portion 140. This allows the entire brace 132 to rotate about the fulcrum axis A free from the lever 116. As shown in FIG. 7, such disengagement of the brace 132 from the lever 116 disconnects the entire hoist means 108 from the actuator means 76, 86.

The hoist means 108 further includes a pair of push rods 148 operatively disposed between the upper end 136 of the brace 132 and the rail 24. As shown best in FIGS. 6–8, the operative connection of the push rods 148 to the rail 24 are disposed generally midway between the forward 26 and rearward 28 ends of the rail 24. The push rods 148 serve two distinct functions.

The first function is for manually forcing the rail 24 to an extended, or semi-extended position, as shown in FIG. 8, for allowing ground crew personnel to attach an ordnance 16 to the rail 24. This is accomplished by a ground crew member manually rotating the screw shaft 110 so as to displace the travelling nut 112 axially upwardly along the screw shaft 110. This movement of the travelling nut 112 causes the lever 116 to rotate in a counterclockwise direction about the axis A, as viewed in FIGS. 6–8. Such rotation of the lever 116 causes the load bearing surface 126 of the lever 116 to engage and forcibly displace the load bearing engaging portion 138 of the brace 132, thereby causing the brace 132 to rotate with the lever 116 counterclockwise about the fulcrum axis A. Such movement of the brace 132 causes an arcuate displacement of the upper end 136 of the brace 132. As the push rods 148 are pivotally connected between the upper ends 136 of the brace 132 and the rail 24, the rail 24 is displaced downwardly to an extended position, as shown in FIG. 8. This manual extension of the rail 24 also causes corresponding movement of the forward link means 34 and the rearward link means 48. This, in turn, causes the forward actuator means 76 and rearward actuator means 86 toward an extended position. The compression springs disposed within the jackets 82, 94 of the respective actuator means 76, 86 become depressed upon this manual extension of the rail 24, and later assist in the retraction of the rail 24 when the travelling nut 112 is manually moved back down the elongated screw shaft 110.

The second function of the push rods 148 is to form a safety latch to maintain the rail 24 in a retracted position, as shown in FIG. 6, when an ordnance 16 is attached to the aircraft 14. More specifically, the brace 132 maintains the rail 24 in its retracted position by way of the latch engaging portion 140 being immovably supported upon the latch 128 of the lever 116. The lever 116, in turn, is restrained from rotation about the fulcrum axis A by the connected travelling nut 112 and associated screw shaft 110. Therefore, the rail 24 can not be extended from the support frame 18 except by actuation of the cartridges 70 whereby the firing piston 142 is fired and extended from the breech housing 72 to disengage the latch 128 from beneath the latch engaging portion 140.

Referring again to FIGS. 6–8, the rail 24 is shown including an automatic ordnance release means, generally indicated at 150. The automatic ordnance release means 150 automatically releases the ordnance 16 from its connection underneath the rail 24 in response to the rail 24 reaching a predetermined spacing from the support frame 18. That is, when the rail 24 is extended from the support frame a preestablished distance, either by manual extension via the hoist means 108 or automatic extension via the actuator means 76, 86, the ordnance 16 will be automatically released from its connection to the rail 24.

This is accomplished by the automatic ordnance release means 150 including a plurality of ordnance retaining hooks 152 moveably disposed on a rail 24. A cam 154 is fixedly disposed on the end of an elongated shaft 156. The shaft 156 extends longitudinally along the rail 24 and is rotatably supported thereon, with the cam 154 being disposed adjacent the forward end 26 of the rail 24. The elongated shaft 156 includes release actuators 158 operatively associated with each ordnance retaining hooks 152.

The forward connecting link 46 includes an outwardly extending tooth 160 disposed adjacent its pivotal connection to the forward end 26 of the rail 24. The tooth 160 is disposed for operatively engaging the cam 154 of the ordnance release means 150 in response to movement of the rail 24 to a predetermined spacing from the support frame 18. Therefore, as the rail 24 moves toward an extended position away from the support frame 18, the forward connecting link 46 pivots in a clockwise direction about its pivotal connection to the forward end 26 of the rail 24, as viewed in FIGS. 6–8, so as to move the tooth 160 into engagement with the cam 154, thereby rotating the cam 154 and connected shaft 156 within its support on the rail 24.

In the preferred embodiment, only two ordnance retaining hooks 152 are employed on only one side of the rail 24, as shown best in FIG. 2. As will be appreciated, a plurality of sway braces 162 must be employed in association with the ordnance retaining hooks 152 in order to securely support the ordnance 116 during flight of the aircraft 14. The sway braces 162 are fixedly attached to the support frame 18, as shown in FIG. 2. These sway braces 162 function only to support the ordnance when the rail 24 is in the fully retracted position. Once the rail 24 begins moving toward an extended position, the ordnance 16 is moved away from the sway braces 162 and is ejected from the rail 24 by the automatic ordnance release means 150 when the rail 24 reaches a predetermined spacing from the support frame 18.

OPERATION

A wiring harness 164 electrically connects the aircraft 14 guidance system and the aircraft 14 pilot to the ordnance ejector apparatus 10. Contained within the lever 116 is a switch (not shown) which allows the ordnance 16 to be ejected when closed, and prevents the ordnance from being ejected when open. This switch can be closed electrically by the pilot, or manually by a member of the ground crew prior to take off. Prior to ejecting the ordnance 16, the pilot utilizes the aircraft guidance system to lock onto a target to which the ordnance 16 will be directed.

When the pilot of the aircraft 14 electronically signals for the ordnance to be ejected, an electrical signal is sent through the wiring harness 164 to the switch disposed in the lever 116, which travels through the closed switch back through the wiring harness 164 to the breech housing 72 at an electrical connection 166. The electrical signal entering the electrical connection 166 causes the pyrotechnic cartridges disposed within the cartridge holders 70 to simultaneously fire, causing energy to be moved through the energy conduction means 102 first to the firing piston 142 and then to the forward 76 and rearward 86 actuator means.

As the firing piston 142 is stroked outwardly, it engages and rotates the trip finger 144 on the brace 132, thereby causing the latch actuator 146 to rotate against the side cam 130, ultimately disengaging the latch 128 from the latch engaging portion 140 of the lever 116. Subsequently, the forward actuator means 76 begins moving the forward link means 34 to displace the forward end 26 of the rail 24. Then, a fraction of a moment later, the rearward actuator means 86 begins moving the rearward link means 48 to displace downwardly the rearward end 28 of the rail 24. As the rail 24 is displaced downwardly toward and ejected condition, the tooth 160 on the forward connecting link 46 engages and rotates the cam 154 of the automatic ordnance release means 150. When the cam 154 is fully actuated, the ordnance retaining hooks 152 fully disengage the ordnance 16 from the rail 24 to effect complete separation of the ordnance 16 from the apparatus 10.

Compression springs disposed within the jackets 82, 94 of the forward 76 and rearward 86 actuator means, respectively, retract the forward 34 and rearward 48 link means back to a fully retracted position. As the rail 24 moves back to the fully retracted position, the rods 148 of the brace 132 rotate the brace 132 back to a position as shown in FIG. 6 whereby the latch engaging portion 140 becomes automatically reengaged over the latch 128.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An ordnance ejector apparatus (10) for ejecting an ordnance (16) from an aircraft (14) comprising: a support frame (18) extending between a forward end (20) and a rearward end (22) for fixed attachment to an aircraft (14); a rail (24) extending between a forward end (26) and a rearward end (28) for releaseably retaining an ordnance (16) thereto; forward link means (34) pivotally connecting said forward end (20) of said support frame (18) and said forward end (26) of said rail (24) for displacing said forward end (26) of said rail (24) from said forward end (20) of said support frame (18) a predetermined distance; rearward link means (48) pivotally connecting said rearward end (22) of said support frame (18) and said rearward end (28) of said rail (24) for displacing said rearward end (28) of said rail (24) from said rearward end (22) of said support frame (18) a predetermined distance; actuator means (76, 86) for controlling the pivotal movement of said forward (34) and rearward (48) link means; and characterized by hoist means (108) operatively extending between said support frame (18) and said rail (24) for manually forcibly separating said rail (24) from said support frame (18) to attach an ordnance to said rail (24) and for automatically disengaging from said actuator means (76, 86) when said actuator means (76, 86) is actuated to allow uninterrupted ejection of the ordnance (16).

2. An apparatus (10) as set forth in claim 1 further characterized by said hoist means (108) including an elongated screw shaft (110) supported on said support frame (18) for independent rotation.

3. An apparatus (10) as set forth in claim 2 further characterized by including a travelling nut (112) threadably disposed on said screw shaft (110).

4. An apparatus (10) as set forth in claim 3 further characterized by said travelling nut (112) including a pair of outwardly extending pintles (114).

5. An apparatus (10) as set forth in claim 4 further characterized by said hoist means (108) including a lever (116) extending between a first end (118) pivotally secured on said pintles (114) of said travelling nut (112) and a second end (122) and having a central fulcrum (124) pivotally attached to said support frame (118).

6. An apparatus (10) as set forth in claim 5 further characterized by said second end (122) of said lever (116) including a load bearing surface (126) and a latch (128) spaced below said load bearing surface (126).

7. An apparatus (10) as set forth in claim 6 further characterized by said latch (128) being pivotally disposed on said second end (122) of said lever (116) and including a coaxially spaced offset side cam (130) movable with said latch (128).

8. An apparatus (10) as set forth in claim 7 further characterized by said hoist means (108) including a brace (132) extending between an upper end (136) and a lower end (134) pivotally connected to said support frame (18) along an axis (A) coaxial with said central fulcrum (124) of said lever (116).

9. An apparatus (10) as set forth in claim 8 further characterized by said brace (132) including a member disposed adjacent said second end (122) of said lever (116) and having a load bearing surface engaging portion (138) and a latch engaging portion (140).

10. An apparatus (10) as set forth in claim 9 further characterized by said latch engaging portion (140) comprising a cylindrical roller disposed to engage said latch (128) of said lever (116).

11. An apparatus (10) as set forth in claim 10 further characterized by said brace (132) including a pivotally supported trip finger (144).

12. An apparatus (10) as set forth in claim 11 further characterized by said brace (132) including a latch actuator (146) operatively connected to said trip finger (144) and disposed to engage said side cam (130) of said lever (116).

13. An apparatus (10) as set forth in claim 12 further characterized by said hoist means (108) including a push rod (148) operatively disposed between said upper end (136) of said brace (132) and said rail (24).

14. An apparatus (10) as set forth in claim 13 further characterized by said operative connection of said push rod (148) to said rail (24) being disposed generally midway between said forward (26) and rearward (28) ends of said rail (24).

* * * * *